United States Patent
Aizawa (10) Patent No.: US 7,791,533 B2
(45) Date of Patent: Sep. 7, 2010

(54) POSITIONING DEVICE, ELECTRONIC INSTRUMENT, AND FILTER PASSBAND CHANGING METHOD

(75) Inventor: Tadashi Aizawa, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 288 days.

(21) Appl. No.: 12/013,178

(22) Filed: Jan. 11, 2008

(65) Prior Publication Data

US 2008/0171510 A1 Jul. 17, 2008

(30) Foreign Application Priority Data

Jan. 16, 2007 (JP) .............................. 2007-007157

(51) Int. Cl.
G01S 1/02 (2010.01)
G01S 5/14 (2010.01)
(52) U.S. Cl. ............................ 342/357.01; 342/357.13
(58) Field of Classification Search ............ 342/357.01, 342/357.02, 357.06, 357.12, 357.15, 357.13; 701/207, 213; 455/3.02
See application file for complete search history.

(56) References Cited

U.S. PATENT DOCUMENTS

| 5,507,025 | A | * | 4/1996 | Rodeffer | 455/266 |
| 5,546,072 | A | * | 8/1996 | Creuseremee et al. | 340/574 |
| 6,363,123 | B1 | * | 3/2002 | Balodis | 375/316 |
| 2003/0056592 | A1 | * | 3/2003 | Tokuda et al. | 73/627 |
| 2008/0100509 | A1 | * | 5/2008 | Kimura | 342/357.12 |
| 2008/0117100 | A1 | * | 5/2008 | Wang et al. | 342/357.02 |

FOREIGN PATENT DOCUMENTS

JP H05-157826 A 6/1993

* cited by examiner

*Primary Examiner*—Dao L Phan
(74) *Attorney, Agent, or Firm*—Global IP Counselors, LLP (57) ABSTRACT

An RF receiver circuit section extracts a signal including the frequency band of a GPS satellite signal by causing a signal received from a GPS satellite to pass through a filter section that includes a plurality of filters having different passbands, and outputs the extracted signal to a baseband process circuit section. The baseband process circuit section exclusively switches the filter of the filter section based on the signal strength of the signal output from the RF receiver circuit section, and the present position of a portable telephone is located based on the signal output from the RF receiver circuit section.

5 Claims, 7 Drawing Sheets

| SATELLITE NO. 2511 | POSITION 2513 | MOVING DIRECTION 2515 | VELOCITY 2517 | SIGNAL STRENGTH 2519 |
|---|---|---|---|---|
| 1 | (Xs1,Ys1,Zs1) | (Xvs1,Yvs1,Zvs1) | V1 | P1 |
| 3 | (Xs3,Ys3,Zs3) | (Xvs3,Yvs3,Zvs3) | V3 | P3 |
| 6 | (Xs6,Ys6,Zs6) | (Xvs6,Yvs6,Zvs6) | V6 | P6 |
| ⋮ | ⋮ | ⋮ | ⋮ | ⋮ |

POSITIONING DEVICE, ELECTRONIC INSTRUMENT, AND FILTER PASSBAND CHANGING METHOD

Japanese Patent Application No. 2007-7157 filed on Jan. 16, 2007, is hereby incorporated by reference in its entirety.

BACKGROUND OF THE INVENTION

The present invention relates to a positioning device, an electronic instrument, and a filter passband changing method.

The global positioning system (GPS) is widely known as a positioning system which utilizes a satellite. The GPS is utilized for a car navigation system and the like. When locating a position using the GPS, a received signal (including a signal converted into an intermediate-frequency signal using a superheterodyne method) obtained by receiving a GPS satellite signal transmitted from a GPS satellite is filtered to remove unnecessary frequency components, and the GPS satellite signal is then acquired and tracked.

Specifically, the phases of a C/A code and a carrier frequency contained in the GPS satellite signal are acquired by performing a correlation process on the received signal which has passed through the filter and a pseudo-generated C/A code replica (code replica) to acquire the GPS satellite signal. The GPS satellite signal is tracked by tracking the phase of the C/A code utilizing a code loop such as a delay locked loop (DLL), and tracking the phase of the carrier frequency utilizing a carrier loop such as a phase locked loop (PLL).

As related technology, JP-A-5-157826 discloses technology which changes the passband of the filter before and after establishment of synchronization with the GPS satellite signal.

According to the technology disclosed in JP-A-5-157826, frequency synchronization is facilitated by increasing the passband of the filter before frequency synchronization is established. On the other hand, if the passband of the filter is widened to a large extent, the number of noise components other than the GPS satellite signal increases, whereby the signal reception sensitivity decreases due to deterioration in S/N ratio.

According to the technology disclosed in JP-A-5-157826, the passband of the filter is decreased after frequency synchronization has been established. On the other hand, if the passband of the filter is narrowed to a large extent, the spread spectrum modulated GPS satellite signal is partially lost, whereby the positioning accuracy deteriorates. Specifically, since the positioning accuracy and the reception sensitivity have a trade-off relationship, changing the passband of the filter taking into account the presence or absence of establishment of frequency synchronization does not necessarily implement control which is appropriate for the reception environment while ensuring positioning accuracy and reception sensitivity.

SUMMARY

According to one aspect of the invention, there is provided a positioning device comprising:

an RF signal receiver circuit section that receives a signal that contains a positioning signal transmitted from a positioning satellite, extracts a signal including a frequency band of the positioning signal from the received signal by causing the received signal to pass through a filter section that has a variable passband, the variable passband including at least the frequency band of the positioning signal, and outputs the extracted signal;

a passband change section that changes the passband of the filter section based on a signal strength of the signal output from the RF signal receiver circuit section; and a positioning section that locates a present position based on the signal output from the RF signal receiver circuit section.

According to another aspect of the invention, there is provided a filter passband changing method that is applied to a filter section included in a positioning device, the positioning device including an RF signal receiver circuit section that receives a signal that contains a positioning signal transmitted from a positioning satellite, extracts a signal including a frequency band of the positioning signal from the received signal by causing the received signal to pass through the filter section that has a variable passband, the variable passband including at least the frequency band of the positioning signal, and outputs the extracted signal, and a positioning section that locates a present position based on the signal output from the RF signal receiver circuit section, the method comprising:

changing the passband of the filter section based on a signal strength of the signal output from the RF signal receiver circuit section.

DETAILED DESCRIPTION OF THE EMBODIMENT

According to one embodiment of the invention, there is provided a positioning device comprising:

an RF signal receiver circuit section that receives a signal that contains a positioning signal transmitted from a positioning satellite, extracts a signal including a frequency band of the positioning signal from the received signal by causing the received signal to pass through a filter section that has a variable passband, the variable passband including at least the frequency band of the positioning signal, and outputs the extracted signal;

a passband change section that changes the passband of the filter section based on a signal strength of the signal output from the RF signal receiver circuit section; and a positioning section that locates a present position based on the signal output from the RF signal receiver circuit section.

According to another embodiment of the invention, there is provided a filter passband changing method that is applied to a filter section included in a positioning device, the positioning device including an RF signal receiver circuit section that receives a signal that contains a positioning signal transmitted from a positioning satellite, extracts a signal including a frequency band of the positioning signal from the received signal by causing the received signal to pass through the filter section that has a variable passband, the variable passband including at least the frequency band of the positioning signal, and outputs the extracted signal, and a positioning section that locates a present position based on the signal output from the RF signal receiver circuit section, the method comprising:

changing the passband of the filter section based on a signal strength of the signal output from the RF signal receiver circuit section.

According to the above configuration, the RF signal receiver circuit section extracts a signal including the frequency band of the positioning signal by causing the received signal from the positioning satellite to pass through the filter section that has a variable passband. The passband of the filter section is changed based on the signal strength of the signal that has passed through the filter section and is output from the RF signal receiver circuit section. Therefore, since the filter passband is appropriately set corresponding to the present signal strength of the received signal and the present reception environment, switching of the filter is appropriately implemented by giving priority to positioning accuracy or reception sensitivity depending on the present reception environment.

In the positioning device, the filter section may include a plurality of filters that differ in passband, the passband including at least the frequency band of the positioning signal; and the passband change section may change the passband of the filter section by exclusively switching a filter among the plurality of filters.

In the method, the filter section may include a plurality of filters that differ in passband, the passband including at least the frequency band of the positioning signal; and the changing the passband of the filter section may include: changing the passband of the filter section by exclusively switching a filter among the plurality of filters.

According to the above configuration, the passband of the filter section is changed by exclusively switching the filter among the plurality of filters that form the filter section and differ in passband.

In the positioning device, the filter section may include a variable-bandwidth filter that has a variable passband, the variable passband including at least the frequency band of the positioning signal; and the passband change section may change the passband of the variable-bandwidth filter.

In the method, the filter section may include a variable-bandwidth filter that has a variable passband including at least the frequency band of the positioning signal; and the changing the passband of the filter section may include: changing the passband of the variable-bandwidth filter.

According to the above configuration, the passband of the variable-bandwidth filter forming the filter section is changed.

In the positioning device, the positioning device may further include:

an accuracy-sensitivity storage section that stores a relationship between positioning accuracy and reception sensitivity with respect to the passband of the filter section and the signal strength of the signal output from the RF signal receiver circuit section, the passband change section may include an optimum condition-satisfying band search section that searches for a passband of the filter section based on data stored in the accuracy-sensitivity storage section, the positioning accuracy and the reception sensitivity satisfying a specific optimum condition with respect to the signal strength of the signal output from the RF signal receiver circuit section in the searched passband, and the passband change section may change the passband of the filter section to the searched passband.

In the method, the method may further include:

searching for a passband of the filter section based on a relationship between positioning accuracy and reception sensitivity with respect to the passband of the filter section and the signal strength of the signal output from the RF signal receiver circuit section, the positioning accuracy and the reception sensitivity satisfying a specific optimum condition with respect to the signal strength of the signal output from the RF signal receiver circuit section in the searched passband; and changing the passband of the filter section to the searched passband.

According to the above configuration, a passband in which the positioning accuracy and the reception sensitivity satisfy a specific optimum condition with respect to the signal strength of the signal output from the RF signal receiver circuit section is searched for based on the relationship between the positioning accuracy and the reception sensitivity with respect to the passband of the filter section and the signal strength of the signal output from the RF signal receiver circuit section. The passband of the filter section is changed to the searched passband.

For example, the optimum condition is set so that a passband in which the positioning accuracy becomes a maximum is searched for when the signal strength is high and a passband in which the reception sensitivity becomes a maximum is searched for when the signal strength is low. This makes it possible to pursue positioning accuracy when the signal reception environment is good and to pursue reception sensitivity when the signal reception environment is poor.

In the positioning device, the positioning device may further include:

a selection section that selects whether to give priority to positioning accuracy or reception sensitivity or the degree of priority based on a user's selection operation, the passband change section changing the passband of the filter section based on the selection result of the selection section, the passband change section may change the passband of the filter section to a widest band of the filter section when highest priority is given to positioning accuracy, and changing the passband of the filter section to a narrowest band of the filter section when highest priority is given to reception sensitivity.

In the method, the method may further include:

selecting whether to give priority to positioning accuracy or reception sensitivity or the degree of priority based on a user's selection operation, the changing the passband of the filter section may include: changing the passband of the filter section based on the selection result, the passband of the filter section being changed to a widest band of the filter section when highest priority is given to positioning accuracy and changed to a narrowest band of the filter section when highest priority is given to reception sensitivity.

According to the above configuration, whether to give priority to positioning accuracy or reception sensitivity or the degree of priority is selected based on the user's selection operation. The passband of the filter section is changed to the widest band when the highest priority is given to positioning accuracy and is changed to the narrowest band when the highest priority is given to reception sensitivity. This makes it possible to appropriately change the passband of the filter section based on the user's selection operation.

According to another embodiment of the invention, there is provided an electronic instrument including the above positioning device.

Embodiments of the invention are described below with reference to the drawings. Note that the embodiments described below do not in any way limit the scope of the invention laid out in the claims. Note that all elements of the embodiments described below should not necessarily be taken as essential requirements for the invention.

An embodiment when applying the invention to a portable telephone (electronic instrument) having a navigation function is described below with reference to the drawings.

1. Configuration

Figure 1:
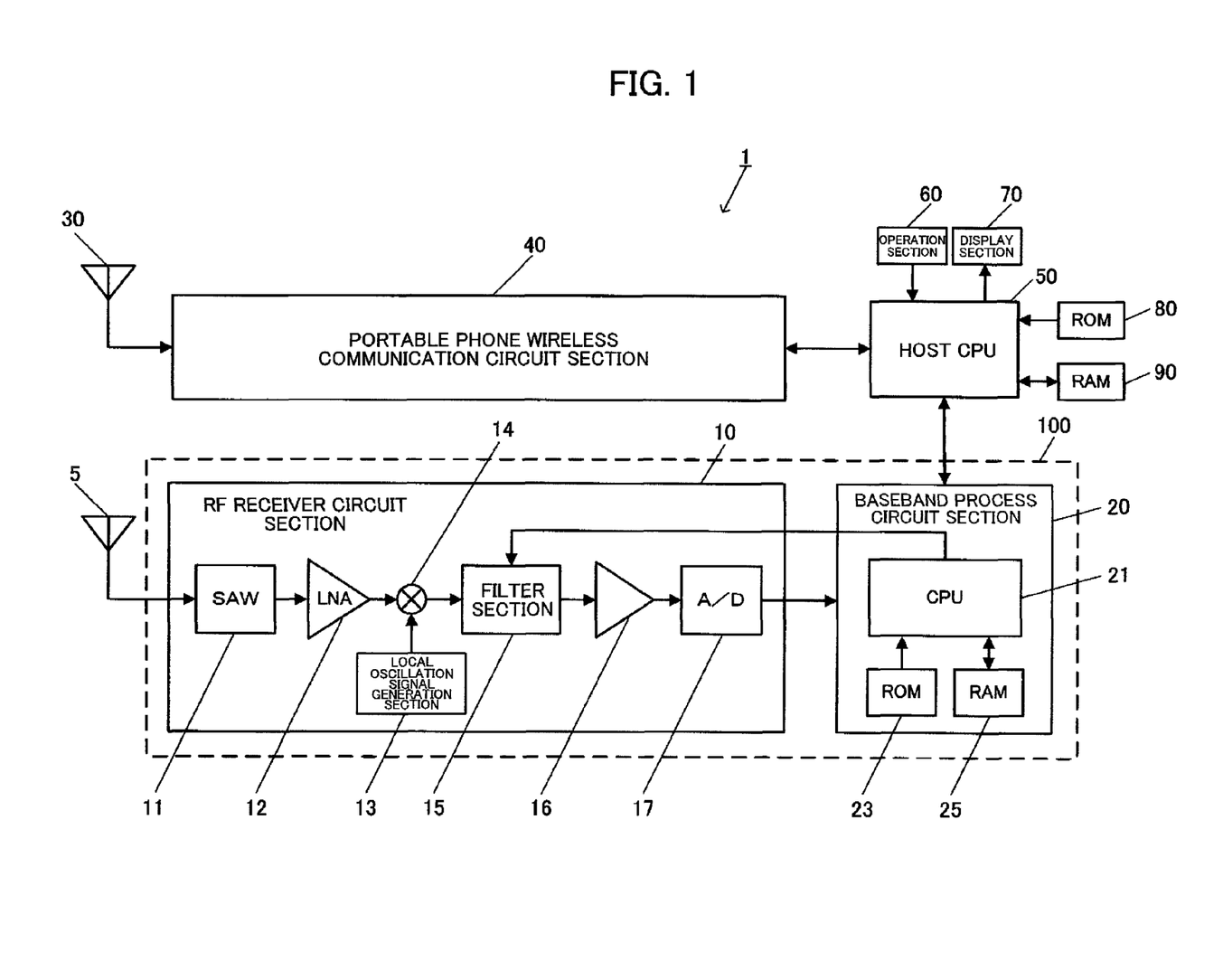
FIG. 1 is a block diagram showing the configuration of a portable telephone.

FIG. 1 is a block diagram showing the functional configuration of a portable telephone 1 according to this embodiment. The portable telephone 1 includes a GPS antenna 5, a radio frequency (RF) receiver circuit section 10, a baseband process circuit section 20, a portable phone antenna 30, a portable phone wireless communication circuit section 40, a host central processing unit (CPU) 50, an operation section 60, a display section 70, a read only memory (ROM) 80, and a random access memory (RAM) 90.

The RF receiver circuit section 10 and the baseband process circuit section 20 form a positioning device 100 which is a characteristic configuration according to this embodiment. The RF receiver circuit section 10 and the baseband process circuit section 20 may be produced as different large scale integrated (LSI) circuits, or may be produced in one chip.

The GPS antenna 5 is an antenna which receives an RF signal including a GPS satellite signal (positioning signal) transmitted from a GPS satellite (positioning satellite). The GPS antenna 5 outputs the received signal to the RF receiver circuit section 10. The GPS satellite signal is a spread spectrum modulated signal called a coarse and acquisition (C/A) code.

The RF receiver circuit section 10 is an RF signal receiver circuit which includes a surface acoustic wave (SAW) filter 11, a low noise amplifier (LNA) 12, a local oscillation signal generation section 13, a multiplier section 14, a filter section 15, an amplifier section 16, and an analog/digital (A/D) conversion section 17.

The SAW filter 11 is a bandpass filter which allows a specific frequency band component to pass through from the signal received by the GPS antenna 5. The SAW filter 11 outputs a signal which has passed through to the LNA 12.

The LNA 12 is a low-noise amplifier which amplifies the signal which has passed through the SAW filter 11. The LNA 12 outputs the amplified signal to the multiplier section 14.

The local oscillation signal generation section 13 is a circuit section which includes an oscillator such as a local oscillator (LO) and generates an RF signal multiplication local oscillation signal. The local oscillation signal generation section 13 outputs the generated local oscillation signal to the multiplier section 14.

The multiplier section 14 down-converts the RF signal into an intermediate-frequency signal (hereinafter referred to as "IF signal") by multiplying the signal amplified by the LNA 12 by the local oscillation signal generated by the local oscillation signal generation section 13, and outputs the resulting signal to the filter section 15. In this embodiment, the frequency of the intermediate-frequency signal of the GPS satellite signal is 100 kHz.

The filter section 15 is a circuit section which includes a plurality of filters which differ in passband including the frequency (100 kHz) of the intermediate-frequency signal of the OPS satellite signal, and allows a passband component of the IF signal output from the multiplier section 14 to pass through. The filter section 15 outputs a signal which has passed through to the amplifier section 16.

Figure 2:
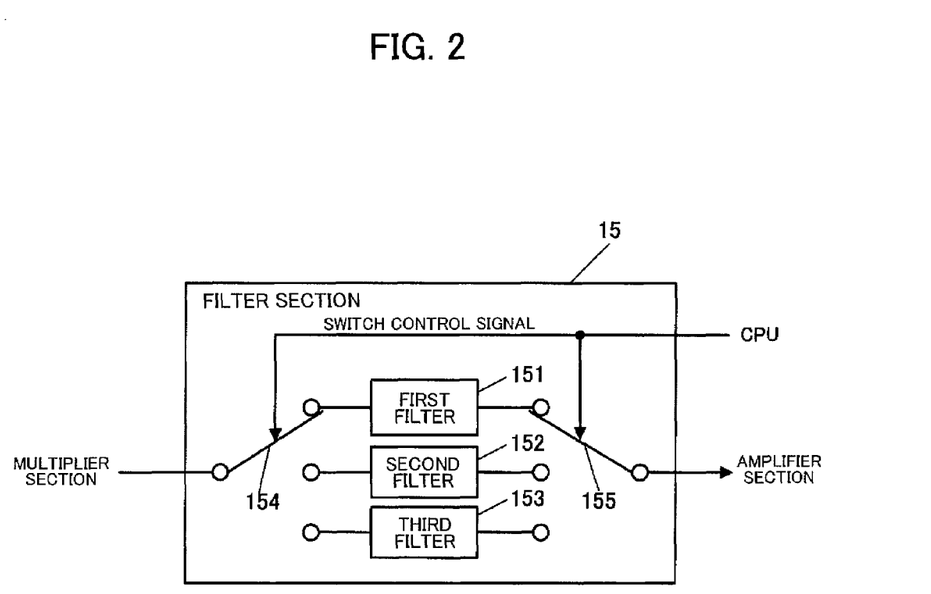
FIG. 2 is a view showing a circuit configuration example of a filter section.

FIG. 2 is a view showing an example of the circuit configuration of the filter section 15.

The filter section 15 includes a first switch 154, a first filter 151, a second filter 152, a third filter 153, and a second switch 155.

The first filter 151, the second filter 152, and the third filter 153 are low-pass filters having a cut-off frequency of 300 kHz, 450 kHz, and 600 kHz, respectively. Specifically, the cut-off frequencies of these filters are higher than the frequency (100 kHz) of the intermediate-frequency signal of the GPS satellite signal by 200 kHz, 350 kHz, and 500 kHz, respectively.

The first switch 154 and the second switch 155 implement switching among the first filter 151, the second filter 152, and the third filter 153 based on a control signal output from a CPU 21 of the baseband process circuit section 20.

The amplifier section 16 is an amplifier which amplifies the signal which has passed through the filter section 15 by a specific amplification factor. The amplifier section 16 outputs the amplified signal to the A/D conversion section 17.

The A/D conversion section 17 is an A/D converter which converts an analog signal into a digital signal. The A/D conversion section 17 converts the signal amplified by the amplifier section 16 into a digital signal, and outputs the resulting digital signal to the baseband process circuit section 20.

The baseband process circuit section 20 is a circuit section which acquires/extracts the GPS satellite signal by performing a correlation process and the like on the IF signal output from the RF receiver circuit section 10, decodes the data to acquire a navigation message, time information, and the like, and performs pseudo-range calculations, positioning calculations, and the like.

The baseband process circuit section 20 includes the CPU 21 which controls each section of the baseband process circuit section 20 and the RF receiver circuit section 10 and performs various calculations including a baseband process described later, a ROM 23, and a RAM 25.

Figure 3A:
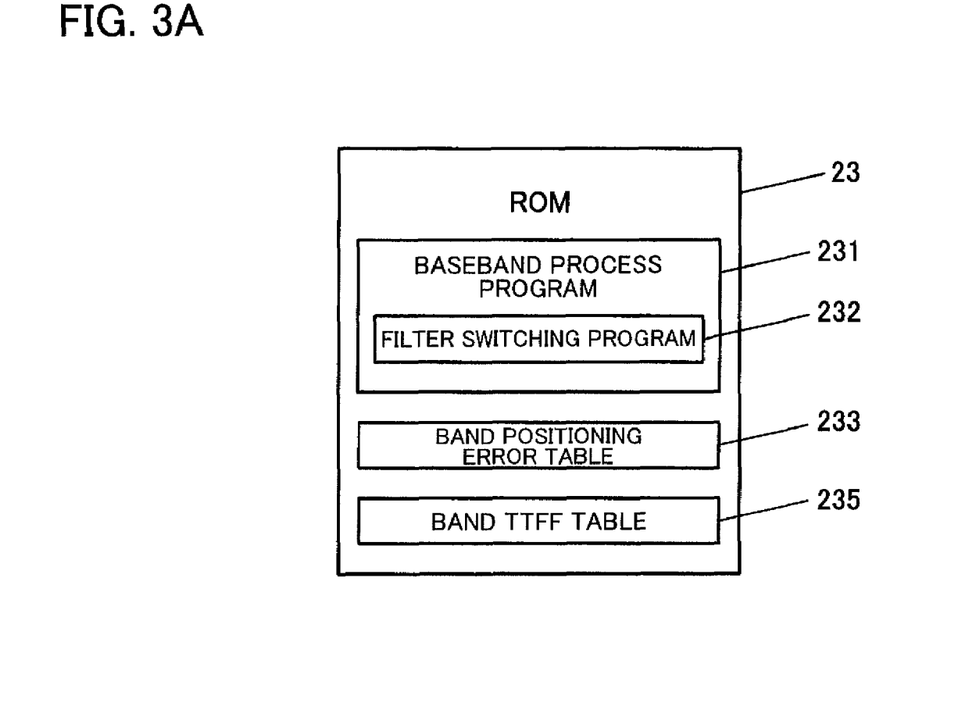
FIG. 3A is a view showing a configuration example of a ROM.
Figure 3B:
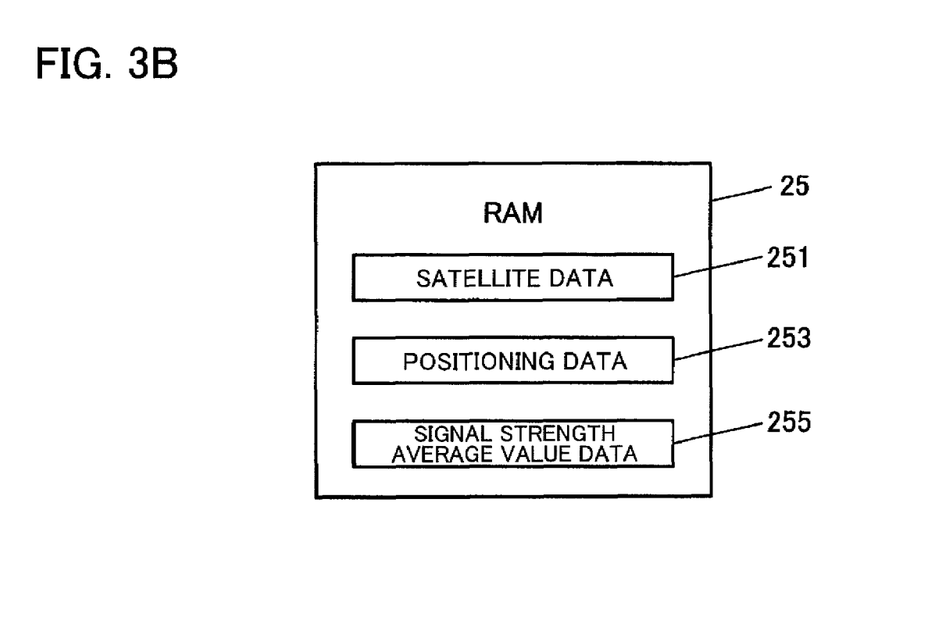
FIG. 3B is a view showing a configuration example of a RAM.

FIGS. 3A and 3B are views showing examples of data stored in the ROM 23 and the RAM 25 included in the baseband process circuit section 20. The ROM 23 is a read-only storage device. The ROM 23 stores a baseband process program 231 which is read by the CPU 21 and executed as a baseband process (see FIG. 6), a band positioning error table 233, and a band time-to-first-fix (TTFF) table 235. The baseband process program 231 includes a filter switching program 232 executed as a filter switching process (see FIG. 7) as a subroutine.

The baseband process refers to a process in which the CPU 21 switches the filter of the filter section 15 and locates a position based on the signal which has passed through the filter section 15 to measure the present position of the portable telephone 1. The details of the baseband process are described later using a flowchart.

The filter switching process refers to a process in which the CPU 21 switches the filter of the filter section 15 based on a positioning error which corresponds to positioning accuracy and a TTFF which corresponds to reception sensitivity obtained based on the signal strength of the acquired GPS satellite signal referring to the band positioning error table 233 and the band TTFF table 235. The details of the filter switching process are described later using a flowchart.

The band positioning error table 233 stores the relationship between the signal strength of the GPS satellite signal and the difference (positioning error) between the actual position and the located position obtained by positioning based on the GPS satellite signal with that signal strength when switching the filter of the filter section 15 to each of the first filter 151, the second filter 152, and the third filter 153 having different cut-off frequencies. The positioning accuracy increases as the positioning error decreases.

The band TTFF table 235 stores the relationship between the signal strength of the GPS satellite signal and the TTFF when switching the filter of the filter section 15 to each of the first filter 151, the second filter 152, and the third filter 153. The term "TTFF" refers to the time (initial positioning time) required to complete the initial positioning after starting positioning when power is supplied to the portable telephone 1. The shorter the TTFF, the higher the signal reception sensitivity.

Figure 4A:
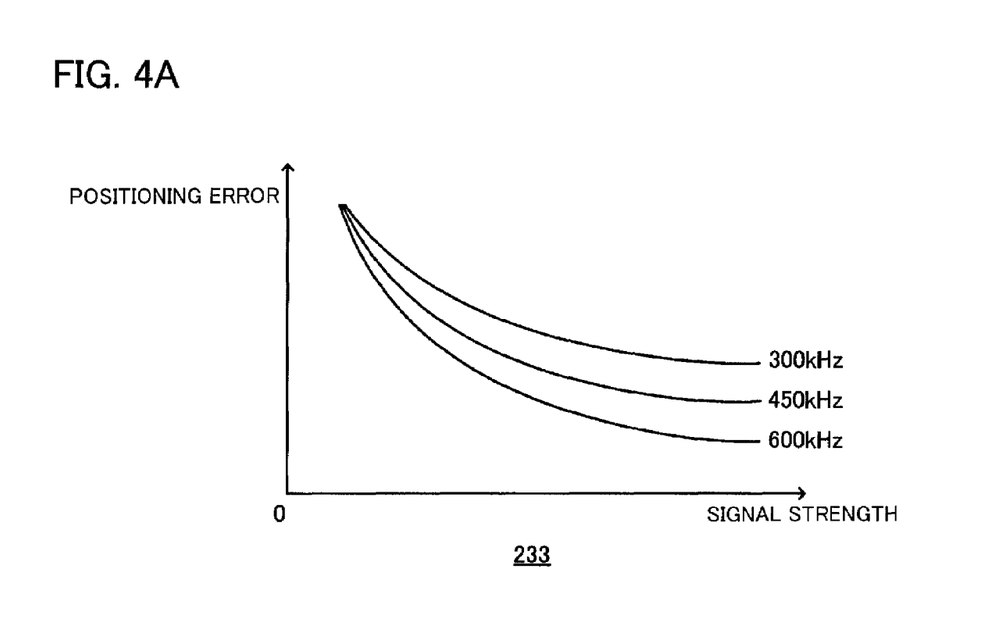
FIG. 4A is a graph showing the relationship between a signal strength and a positioning error.
Figure 4B:
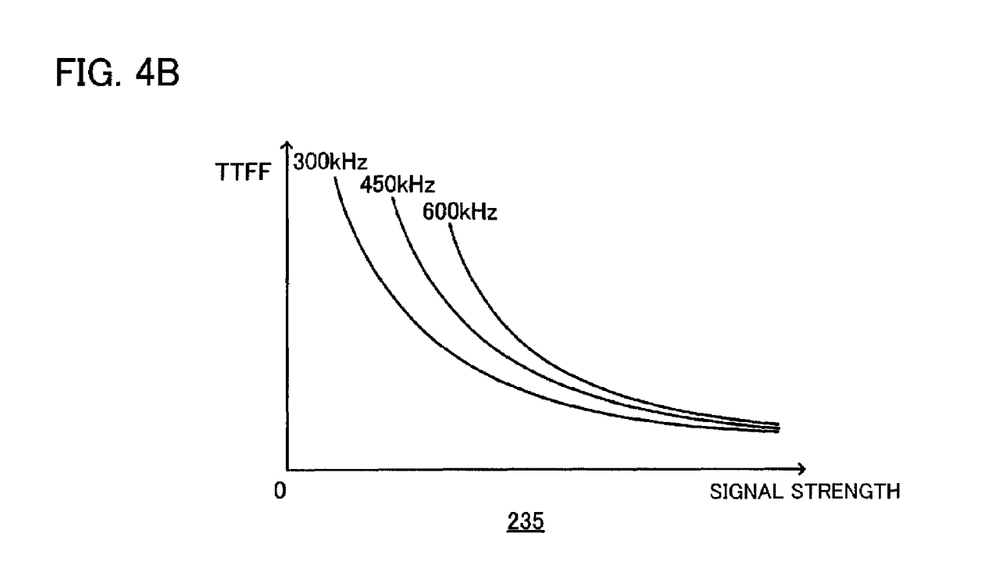
FIG. 4B is a graph showing the relationship between a signal strength and a TTFF.

FIGS. 4A and 4B are graphs qualitatively showing the data stored in the band positioning error table 233 and the band TTFF table 235. FIG. 4A is a view showing the relationship between the signal strength and the positioning error when the cut-off frequency is 300 kHz (first filter 151), 450 kHz (second filter 152), or 600 kHz (third filter 153), and FIG. 4B is a view showing the relationship between the signal strength and the TTFF when the cut-off frequency is 300 kHz, 450 kHz, or 600 kHz.

In FIG. 4A, the positioning error decreases as the signal strength increases when the passband (cut-off frequency) of the filter is 300 kHz, 450 kHz, or 600 kHz. The positioning error becomes a minimum when the cut-off frequency is 600 kHz and becomes a maximum when the cut-off frequency is 300 kHz irrespective of the signal strength. The difference in positioning error between the bands decreases as the signal strength decreases, and increases as the signal strength increases.

In FIG. 4B, the TTFF decreases as the signal strength increases when the passband (cut-off frequency) of the filter is 300 kHz, 450 kHz, or 600 kHz. The TTFF becomes a minimum when the cut-off frequency is 300 kHz and becomes a maximum when the cut-off frequency is 600 kHz irrespective of the signal strength. The difference in TTFF between the bands increases as the signal strength decreases, and decreases as the signal strength increases. Therefore, the positioning error and the TTFF show opposite characteristics with respect to the signal strength and the cut-off frequency.

In this embodiment, the filter of the filter section 15 is switched utilizing the above characteristics. Specifically, when the signal strength is low, since the difference in positioning error between the passbands is small and the difference in TTFF between the passbands is large, the filter is switched to a filter with a narrow passband (low cut-off frequency) in order to decrease the TTFF as a result of giving priority to reception sensitivity over positioning accuracy. On the other hand, when the signal strength is high, since the difference in positioning error between the passbands is large and the difference in TTFF between the passbands is small, the filter is switched to a filter with a wide passband (high cut-off frequency) in order to decrease the positioning error as a result of giving priority to positioning accuracy over reception sensitivity.

Specifically, the average value of the signal strengths (hereinafter referred to as "signal strength average value") is calculated from the signal strengths of the acquired GPS satellite signals. The positioning error and the TTFF corresponding to the signal strength average value are specified for the passband of each filter referring to the band positioning error table 233 and the band TTFF table 235. An evaluation value E is calculated according to the following equation (1) using the specified positioning error and TTFF, and the filter is switched to a filter with a passband for which the evaluation value E is a minimum.

$$E = a \cdot \text{positioning error} + b \cdot TTFF \quad (1)$$

a and b in the equation (1) are parameters which determine the degrees of priority given to the positioning error (positioning accuracy) and the TTFF (reception sensitivity), respectively. For example, values may be selected so the ratio of a and b is "1:1". However, since the units for the positioning error and the TTFF differ, each value cannot necessarily be handled directly. Therefore, it is preferable to adjust the values of the parameters a and b to appropriate values.

The RAM 25 is a readable/writable storage device. The RAM 25 stores satellite data 251, positioning data 253, and signal strength average value data 255, for example.

Figure 5:
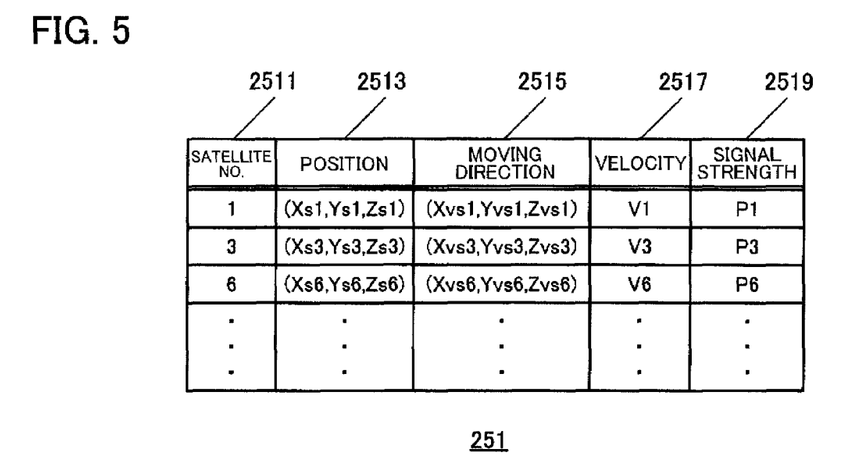
FIG. 5 is a view showing a data configuration example of satellite data.

FIG. 5 is a view showing a data configuration example of the satellite data 251. Satellite information including a satellite number 2511, a position 2513, a moving direction 2515, a velocity 2517, and a signal strength 2519 of the acquired satellite is stored as the satellite data 251. The position 2513 of the satellite is indicated by three-dimensional coordinates in the terrestrial reference frame, and the moving direction 2515 is indicated by a three-dimensional unit vector in the terrestrial reference frame, for example. The satellite data 251 is updated when the satellite information is calculated by the CPU 21 in the baseband process.

The positioning data 253 is data relating to the located position of the portable telephone 1. For example, three-dimensional coordinates in the terrestrial reference frame are stored as the positioning data 253. The present position calculated by positioning performed by the CPU 21 in the baseband process is stored as the positioning data 253 in time series.

The signal strength average value data 255 is data relating to the signal strength average value of the acquired satellite. The signal strength average value data 255 is updated when the signal strength average value is calculated by the CPU 21 in the baseband process.

The portable phone antenna 30 is an antenna which transmits and receives a portable phone radio signal between the portable telephone 1 and a radio base station installed by a portable telephone communication service provider.

The portable phone wireless communication circuit section 40 is a portable telephone communication circuit section including an RF conversion circuit, a baseband process circuit, and the like. The portable phone wireless communication circuit section 40 implements a telephone call, e-mail transmission/reception, and the like by modulating/demodulating the portable phone radio signal, for example.

The host CPU 50 is a processor which controls each section of the portable telephone 1 based on various programs such as a system program stored in the ROM 80. The host CPU 50 mainly controls the telephone function, and causes the display section 70 to display a navigation screen in which the present position of the portable telephone 1 located by the baseband process circuit section 20 is plotted.

The operation section 60 is an input device including an operation key, a button switch, and the like, and outputs a press signal to the host CPU 50. Various instruction inputs such as a telephone call request and a navigation screen display request are performed by operating the operation section 60.

The display section 70 is a display device which includes a liquid crystal display (LCD) or the like, and displays various images based on a display signal input from the host CPU 50. The display section 70 displays date and time information, a navigation screen, and the like.

The ROM 80 stores various programs and data such as a system program for controlling the portable telephone 1, a program for implementing a telephone call and e-mail transmission/reception, a program for implementing a navigation function, and map data. The host CPU 50 performs a process based on these programs and data.

The RAM 90 serves as a work area which temporarily stores the system program executed by the host CPU 50, various processing programs, data processed during various processes, processing results, and the like.

2. Process Flow

Figure 6:
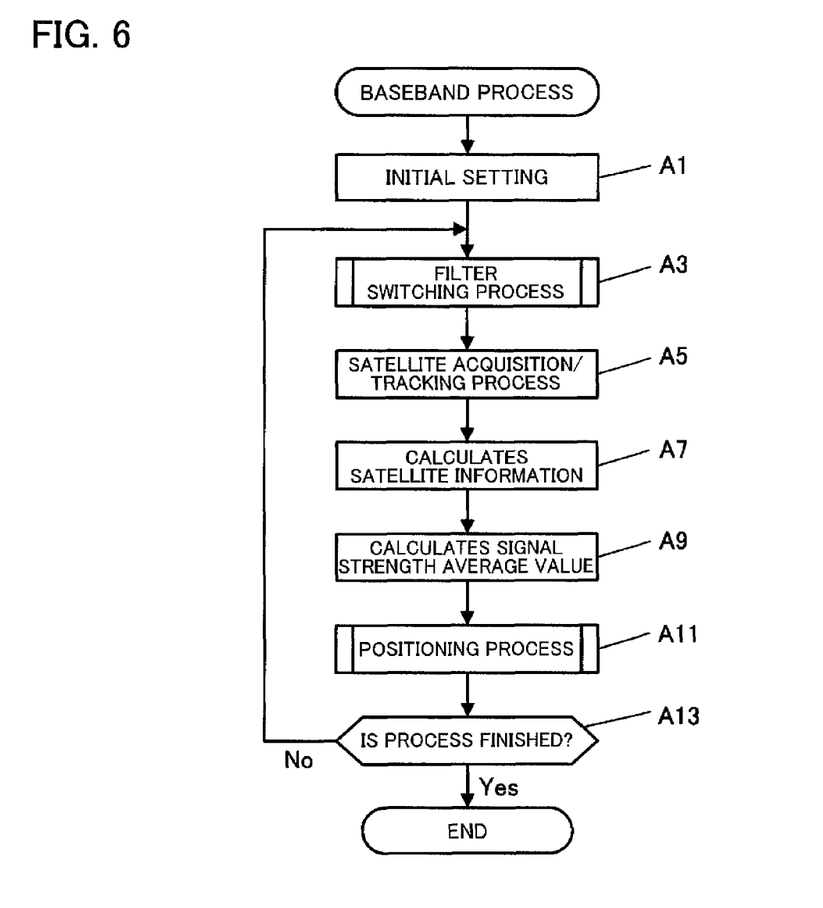
FIG. 6 is a flowchart showing the flow of a baseband process.

FIG. 6 is a flowchart showing the flow of the baseband process performed by the baseband process circuit section 20 by causing the CPU 21 to read and execute the baseband process program 231 stored in the ROM 23. In the baseband process, the IF signal is input to the baseband process circuit section 20 at any time as a result of reception of the RF signal by the GPS antenna 5, down-conversion of the RF signal into the IF signal by the RF receiver circuit section 10, and the like.

The CPU 21 performs an initial setting (step A1). Specifically, the CPU 21 sets the signal strength average value at an initial value specified in advance, and stores the signal strength average value in the RAM 25 as the signal strength average value data 255. The CPU 21 also sets the parameters a and b in the equation (1) for calculating the evaluation value E at values specified in advance.

The CPU 21 then performs the filter switching process by reading and executing the filter switching program 232 stored in the ROM 23 (step A3).

Figure 7:
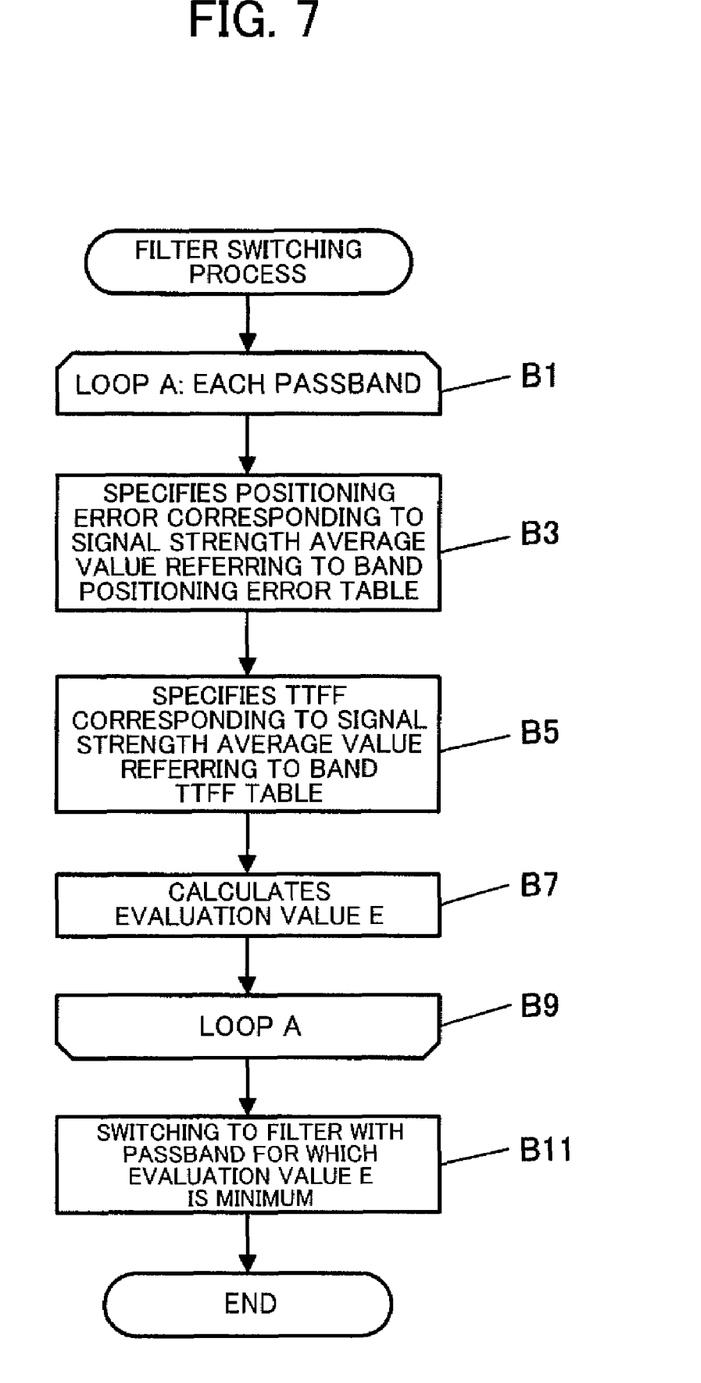
FIG. 7 is a flowchart showing the flow of a filter switching process.

FIG. 7 is a flowchart showing the flow of the filter switching process.

The CPU 21 executes a loop A on each of the passbands of the first filter 151, the second filter 152, and the third filter 153 of the filter section 15 (steps B1 to B9). In the loop A, the CPU 21 specifies the positioning error corresponding to the signal strength average value stored as the signal strength average value data 255 referring to the band positioning error table 233 stored in the ROM 23 (step B3). The CPU 21 also specifies the TTFF corresponding to the signal strength average value referring to the band TTFF table 235 (step B5).

The CPU 21 calculates the evaluation value E according to the equation (1) using the positioning error and the TTFF specified in the steps B3 and B5 (step B7), and performs the process on the next passband. After performing the process in the steps B3 to B7 on all of the passbands, the CPU 21 finishes the loop A (step B9).

The CPU 21 then outputs the control signal which implements switching to a filter with a passband for which the evaluation value E is a minimum to the first switch 154 and the second switch 155 of the filter section 15 to switch the filter (step B11). The CPU 21 thus finishes the filter switching process.

Again referring to the baseband process shown in FIG. 6, after the filter switching process has been completed (step A3), the CPU 21 performs a satellite acquisition/tracking process of acquiring/tracking the GPS satellite signal from the IF signal output from RF receiver circuit section 10 (step A5). In this example, the CPU 21 acquires/tracks the GPS satellite signal by means of software. Note that the GPS satellite signal may be acquired/tracked by means of hardware by independently providing a satellite acquisition/tracking section which includes circuits such as a code loop known as a delay locked loop (DLL) and a carrier loop known as a phase locked loop (PLL), for example.

The CPU 21 decodes a navigation message and time information from the UPS satellite signal acquired/tracked in the step A5, and calculates the position 2513, the moving direction 2515, the velocity 2517, and the signal strength 2519 of the satellite based on the decoded information (step A7). The CPU 21 updates the satellite data 251 stored in the RAM 25 with the satellite information associated with the satellite number 2511.

The CPU 21 calculates the average value of the signal strengths 2519 of all satellites stored as the satellite data 251 (step A9), and updates the signal strength average value data 255 stored in the RAM 25.

The CPU 21 performs known positioning calculations based on the satellite information stored as the satellite data 251 to locate the present position of the portable telephone 1 (step A11). The CPU 21 updates the positioning data 253 stored in the RAM 25 with the located present position.

After completion of the above steps, the CPU 21 determines whether or not to finish the baseband process (step A13). Specifically, the CPU 21 determines to finish the process when a process finish signal is input from the host CPU 50 when the user has performed an instruction operation which causes the navigation function to be turned OFF or an instruction operation which causes the power supply of the portable telephone 1 to be turned OFF using the operation section 60.

When the CPU 21 has determined to continue the process (step A13: No), the CPU 21 returns to the step A3. When the CPU 21 has determined to finish the process (step A13: Yes), the CPU 21 finishes the baseband process.

3. Effects

According to this embodiment, the filter used to extract the GPS satellite signal contained in the received signal is exclusively selected and switched among a plurality of filters having different passbands. The filter switching process is performed based on the data stored in the ROM 23 which specifies the relationship between the positioning error and the TTFF with respect to the passband of each filter and the signal strength of the signal output from the RF receiver circuit section 10. Specifically, switching occurs to a filter for which the evaluation value B calculated according to the equation (1) using the positioning error and the TTFF corresponding to the calculated signal strength is a minimum.

That is, switching to a wide-band filter occurs when the signal strength is high in order to increase the positioning accuracy, and switching to a narrow-band filter occurs when the signal strength is low in order to increase the reception sensitivity. Therefore, control which always achieves optimum reception is implemented by dynamically determining whether to give priority to positioning accuracy or reception sensitivity depending on the signal strength of the received signal and the reception environment of the GPS satellite signal.

4. Modification 4-1. Electronic Instrument

The invention may be applied to various electronic instruments such as a portable navigation device, a personal digital assistant (PDA), and a personal computer in addition to the portable telephone.

4-2. Satellite Positioning System

The above embodiments have been described taking the GPS as an example of the satellite positioning system. Note that the invention may also be applied to other satellite positioning systems such as the wide area augmentation system (WAAS), the Quasi Zenith Satellite System (QZSS), the Global Navigation Satellite System (GLONASS), and the GALILEO.

4-3. Splitting of Process

The host CPU 50 may perform some or all of the processes performed by the CPU 21 of the baseband process circuit section 20. For example, the host CPU 50 may perform the filter switching process, and the CPU 21 may perform the satellite acquisition/tracking process and the positioning process. The host CPU 50 may perform the positioning process based on the GPS satellite signal acquired/tracked by the CPU 21.

4-4. Number of Filters

The above embodiments have been described taking an example in which the filter section 15 includes three filters with different pass bands. Note that the filter section 15 may include two filters respectively having a cut-off frequency of 300 kHz and 600 kHz, for example. The filter section 15 may include four or more filters by further dividing the cut-off frequency. In this case, it is necessary to store data corresponding to the passband of each filter in the band positioning error table 233 and the band TTFF table 235 stored in the ROM 23.

4-5. Variable-bandwidth Filter

The filter section 15 may include a variable-bandwidth filter of which the passband can be changed. In this case, the variable-bandwidth filter is set to have passbands having a cut-off frequency of 300 kHz, 450 kHz, and 600 kHz, for example. The CPU 21 calculates the evaluation value E in band units according to the equation (1), and causes the passband of the variable-bandwidth filter to be changed to a band for which the evaluation value E is a minimum.

4-6. Number of Stages of Filter

The above embodiments have been described taking an example in which the number of stages of the filter section 15 of the RF receiver circuit section 10 is one. Note that the number of stages of the filter section 15 may be two or more.

Figure 8:
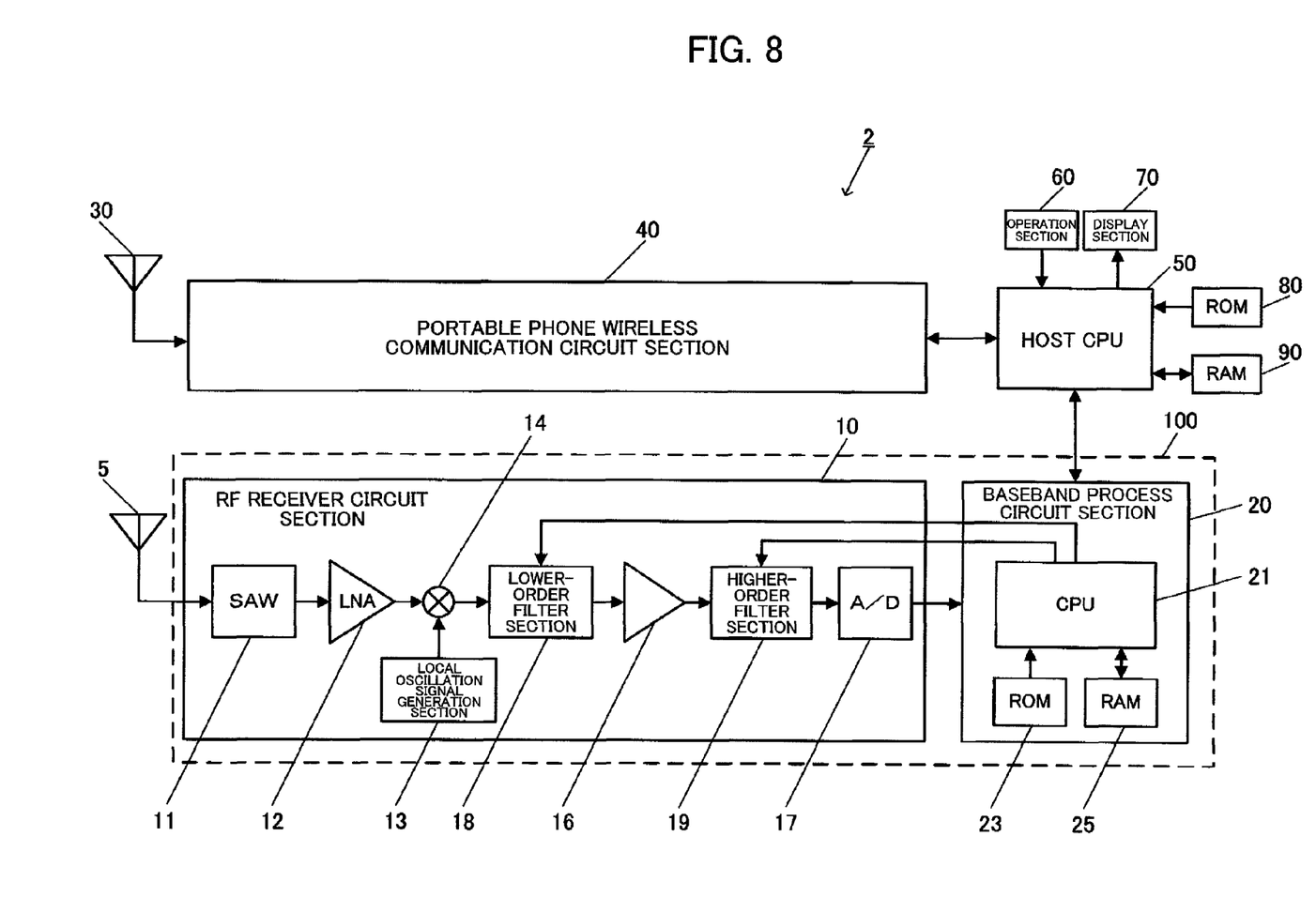
FIG. 8 is a block diagram showing the configuration of a portable telephone according to a modification.

FIG. 8 is a block diagram showing the configuration of a portable telephone 2 according to this modification. The same elements as the elements of the portable telephone 1 are indicated by the same symbols. Description of these elements is omitted. The portable telephone 2 differs from the portable telephone 1 in that the portable telephone 2 has a two-stage filter configuration in which a lower-order filter section 18 and a higher-order filter section 19 are respectively provided in the preceding stage and the subsequent stage of the amplifier section 16.

The lower-order filter section 18 and the higher-order filter section 19 are configured so that switching among a plurality of filters can be achieved based on the control signal from the CPU 21 in the same manner as in the filter section 15 shown in FIG. 2.

In this case, the ROM 23 stores a table which specifies the relationship between the signal strength and the positioning error and a table which specifies the relationship between the signal strength and the TTFF for combinations of the filters of the higher-order filter section 19 and the filters of the lower-order filter section 18. The CPU 21 calculates the evaluation value E using these tables, and outputs the control signal so that switching to a combination for which the evaluation value E is a minimum occurs.

The filter switching process may be performed on one of the filter sections instead of performing the filter switching process on both of the filter sections.

4-7. Selection of Whether to Give Priority to Positioning Accuracy or Reception Sensitivity The values of the parameters a and b in the equation (1) which determine the degree of priority given to positioning accuracy and reception sensitivity may be selected/set based on a selection operation of the user. Specifically, candidates for the ratio of the parameters a and b (hereinafter referred to as "priority ratio") are displayed on the display section 70 in the step A1 of the baseband process shown in FIG. 6. The user selects one priority ratio using the operation section 60, and values corresponding to the priority ratio selected using the operation section 60 are set as the parameters a and b. The user may be allowed to input the values of the parameters a and b instead of selecting the priority ratio.

The user may be allowed to select whether to give priority to positioning accuracy or reception sensitivity. When the user has selected to give priority to positioning accuracy, the values of the parameters a and b are set so that the priority ratio is "2:1", for example. When the user has selected to give priority to reception sensitivity, the values of the parameters a and b are set so that the priority ratio is "1:2", for example.

4-8. Storage Medium

A configuration may be employed in which the baseband process program 231 and the filter switching program 232 stored in the ROM 23 are stored in a storage medium such as a CD-ROM, a DVD-ROM, or a flash memory, and the CPU 21 reads and executes the program stored in the storage medium. In this case, the band positioning error table 233 and the band TTFF table 235 may also be stored in the storage medium.

Although only some embodiments of the invention have been described above in detail, those skilled in the art would readily appreciate that many modifications are possible in the embodiments without materially departing from the novel teachings and advantages of the invention. Accordingly, such modifications are intended to be included within the scope of the invention.

What is claimed is:

1. A positioning device comprising:

an RF signal receiver circuit section that receives a signal that contains a positioning signal transmitted from a positioning satellite, extracts a signal including a frequency band of the positioning signal from the received signal by causing the received signal to pass through a filter section that has a variable passband, the variable passband including at least the frequency band of the positioning signal, and outputs the extracted signal;

a passband change section that changes the passband of the filter section based on a signal strength of the signal output from the RF signal receiver circuit section;

a positioning section that locates a present position based on the signal output from the RF signal receiver circuit section; and an accuracy-sensitivity storage section that stores a relationship between positioning accuracy and reception sensitivity with respect to the passband of the filter section and the signal strength of the signal output from the RF signal receiver circuit section, the passband change section including an optimum condition-satisfying band search section that searches for a passband of the filter section based on data stored in the accuracy-sensitivity storage section, the positioning accuracy and the reception sensitivity satisfying a specific optimum condition with respect to the signal strength of the signal output from the RF signal receiver circuit section in the searched passband, the passband change section changing the passband of the filter section to the searched passband.

2. A positioning device comprising:

an RF signal receiver circuit section that receives a signal that contains a positioning signal transmitted from a positioning satellite, extracts a signal including a frequency band of the positioning signal from the received signal by causing the received signal to pass through a filter section that has a variable passband, the variable passband including at least the frequency band of the positioning signal, and outputs the extracted signal;

a passband change section that changes the passband of the filter section based on a signal strength of the signal output from the RF signal receiver circuit section;

a positioning section that locates a present position based on the signal output from the RF signal receiver circuit section; and a selection section that selects whether to give priority to positioning accuracy or reception sensitivity or the degree of priority based on a user's selection operation, the passband change section changing the passband of the filter section based on the selection result of the selection section, the passband change section changing the passband of the filter section to a widest band of the filter section when highest priority is given to positioning accuracy, and changing the passband of the filter section to a narrowest band of the filter section when highest priority is given to reception sensitivity.

3. An electronic instrument including the positioning device as defined in claim 1.

4. A filter passband changing method that is applied to a filter section included in a positioning device, the positioning device including an RF signal receiver circuit section that receives a signal that contains a positioning signal transmitted from a positioning satellite, extracts a signal including a frequency band of the positioning signal from the received signal by causing the received signal to pass through the filter section that has a variable passband, the variable passband including at least the frequency band of the positioning signal, and outputs the extracted signal, and a positioning section that locates a present position based on the signal output from the RF signal receiver circuit section, the method comprising:

changing the passband of the filter section based on a signal strength of the signal output from the RF signal receiver circuit section;

searching for a passband of the filter section based on a relationship between positioning accuracy and reception sensitivity with respect to the passband of the filter section and the signal strength of the signal output from the RF signal receiver circuit section, the positioning accuracy and the reception sensitivity satisfying a specific optimum condition with respect to the signal strength of the signal output from the RF signal receiver circuit section in the searched passband; and changing the passband of the filter section to the searched passband.

5. A filter passband changing method that is applied to a filter section included in a positioning device, the positioning device including an RF signal receiver circuit section that receives a signal that contains a positioning signal transmitted from a positioning satellite, extracts a signal including a frequency band of the positioning signal from the received signal by causing the received signal to pass through the filter section that has a variable passband, the variable passband including at least the frequency band of the positioning signal, and outputs the extracted signal, and a positioning section that locates a present position based on the signal output from the RF signal receiver circuit section, the method comprising:

changing the passband of the filter section based on a signal strength of the signal output from the RF signal receiver circuit section; and selecting whether to give priority to positioning accuracy or reception sensitivity or the degree of priority based on a user's selection operation, the changing the passband of the filter section including changing the passband of the filter section based on the selection result, the passband of the filter section being changed to a widest band of the filter section when highest priority is given to positioning accuracy and changed to a narrowest band of the filter section when highest priority is given to reception sensitivity.

* * * * *